United States Patent
Pfeiffer et al.

(10) Patent No.: US 9,340,376 B2
(45) Date of Patent: May 17, 2016

(54) APPARATUS AND SYSTEM FOR TRANSFERRING CARTS

(71) Applicant: Toyota Motor Engineering & Manufacturing North America, Inc., Erlanger, KY (US)

(72) Inventors: Randy Lee Pfeiffer, Haubstadt, IN (US); Aaron James Wilson, Tennyson, IN (US); Kenneth W. Raider, Evansville, IN (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 14 days.

(21) Appl. No.: 13/973,198

(22) Filed: Aug. 22, 2013

(65) Prior Publication Data

US 2015/0056044 A1    Feb. 26, 2015

(51) Int. Cl.
*B65G 65/00*    (2006.01)

(52) U.S. Cl.
CPC ..................................... *B65G 65/00* (2013.01)

(58) Field of Classification Search
CPC .... B65G 43/08; B65G 37/02; B65G 2201/02; B65G 4/53; B65G 47/54; B65G 47/5122; B65G 47/261; B65G 47/682
USPC ............. 198/339.1, 340, 347.1, 347.2, 347.4, 198/370.04, 370.07, 370.09, 369.3; 414/222.05, 267, 277, 280, 284, 401, 414/402, 349, 608, 807, 787
See application file for complete search history.

(56) References Cited

U.S. PATENT DOCUMENTS

| | | | |
|---|---|---|---|
| 3,887,204 A | 6/1975 | Austin | |
| 4,047,625 A * | 9/1977 | Grant | 414/651 |
| 4,218,034 A | 8/1980 | Magill | |
| 8,151,968 B2 | 4/2012 | Bremhorst | |
| 8,272,496 B2 | 9/2012 | Itoh et al. | |
| 8,397,897 B2 | 3/2013 | Bastian, II et al. | |
| 2006/0202047 A1 * | 9/2006 | Klauder, Jr. | 238/15 |
| 2011/0217150 A1 * | 9/2011 | Takehara et al. | 414/392 |

FOREIGN PATENT DOCUMENTS

| | | |
|---|---|---|
| JP | 63288826 A | 10/1981 |
| WO | 8102885 A1 | 11/1988 |

OTHER PUBLICATIONS

Automationdirect.com website; Oct. 5, 2012.*

* cited by examiner

*Primary Examiner* — Ernesto Suarez
*Assistant Examiner* — Ronald Jarrett
(74) *Attorney, Agent, or Firm* — Dinsmore & Shohl LLP (57) ABSTRACT

In one embodiment, an apparatus for transferring carts may include a transfer surface, a loading station lift, a working station lift, and a controller. The transfer surface may include a loading station and a working station arranged laterally with respect to the loading station. The loading station lift may include loading station rollers that are in rotatable engagement with the loading station lift. The working station lift may include working station rollers that are in rotatable engagement with the working station lift. The controller that can actuate the loading station lift and the working station lift between a loading state with the loading station rollers and the working station rollers offset a relatively low distance above the transfer surface and a transferring state with the loading station rollers and the working station rollers offset a relatively high distance above the transfer surface.

18 Claims, 8 Drawing Sheets

APPARATUS AND SYSTEM FOR TRANSFERRING CARTS

TECHNICAL FIELD

The present specification generally relates to apparatus and systems for transferring carts and, more specifically, to apparatus and systems for transferring carts laterally.

BACKGROUND

As background, the manufacture of automobiles can frequently require heavy cargo (e.g., parts and assemblies) weighing hundreds or thousands of pounds to be moved throughout a manufacturing facility. Such cargo can be transferred on carts having fixed wheels, swiveling casters, or both. For example, the cart can include four swiveling casters or two fixed wheels and two swiveling casters. The cart with four swiveling casters can have greater lateral mobility than the cart with only two swiveling casters. However, the cart with greater lateral mobility can be more difficult to maneuver, in particular, when the cart is transporting relatively heavy cargo.

Accordingly, a need exists for alternative apparatus and systems for transferring carts.

SUMMARY

In one embodiment, an apparatus for transferring carts may include a transfer surface, a loading station lift, a working station lift, and a controller. The transfer surface may include a loading station and a working station arranged laterally with respect to the loading station. The loading station lift can be disposed within the loading station of the transfer surface. The loading station lift may include loading station rollers that are in rotatable engagement with the loading station lift. The working station lift can be disposed within the working station of the transfer surface and aligned with the loading station lift. The working station lift may include working station rollers that are in rotatable engagement with the working station lift. The controller that can actuate the loading station lift and the working station lift between a loading state and a transferring state. When the loading station lift and the working station lift are in the loading state, the loading station rollers and the working station rollers can be offset a relatively low distance above the transfer surface. When the loading station lift and the working station lift are in the transferring state, the loading station rollers and the working station rollers can be offset a relatively high distance above the transfer surface. The loading station rollers and the working station rollers can be aligned along a lateral direction.

In another embodiment, an apparatus for transferring carts may include a transfer surface, a loading station, a working station, a downward input device, and an upward input device. The transfer surface may include a loading station and a working station arranged laterally with respect to the loading station. The loading station lift can be fixedly engaged with the transfer surface within the loading station. The loading station lift may include loading station rollers that are in rotatable engagement with the loading station lift. The working station lift can be fixedly engaged with the transfer surface within the loading station and aligned with the loading station lift. The working station lift may include working station rollers that are in rotatable engagement with the working station lift. The downward input device can be offset at least a relatively high distance from the transfer surface. When the downward input device is actuated, the loading station lift and the working station lift can transition to a loading state such that the loading station rollers and the working station rollers are offset a relatively low distance above the transfer surface. The upward input device can be located adjacent to the working station. When the upward input device is actuated, the loading station lift and the working station lift can be transitioned to a working state such that the loading station rollers and the working station rollers are offset the relatively high distance above the transfer surface.

In yet another embodiment, a system for transferring cargo along a lateral path may include a cart, a transfer surface, a loading station lift, a working station lift, and a controller. The cart may include one or more swivel casters and a roller engagement member located on an underside of the cart. The transfer surface can include a loading station and a working station arranged laterally with respect to the loading station. Each of the loading station and the working station of the transfer surface can demarcate a cart area that is greater than or equal to a footprint of the cart. The loading station lift can be disposed within the loading station of the transfer surface. The loading station lift may include loading station rollers that are in rotatable engagement with the loading station lift. The working station lift can be disposed within the working station of the transfer surface and aligned with the loading station lift. The working station lift may include working station rollers that are in rotatable engagement with the working station lift. The controller can actuate the loading station lift and the working station lift between a loading state and a transferring state. When the loading station lift and the working station lift are in the loading state and the cart is in the loading station, the roller engagement member can be located above and out of contact with the loading station rollers. When the loading station lift and the working station lift are in the transferring state and the cart is in the loading station, the roller engagement member of the cart can contact the loading station rollers. The one or more swivel casters of the cart can contact the transfer surface. The roller engagement member of the cart can cooperate with the loading station rollers and the working station rollers as the cart is urged along the lateral path.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
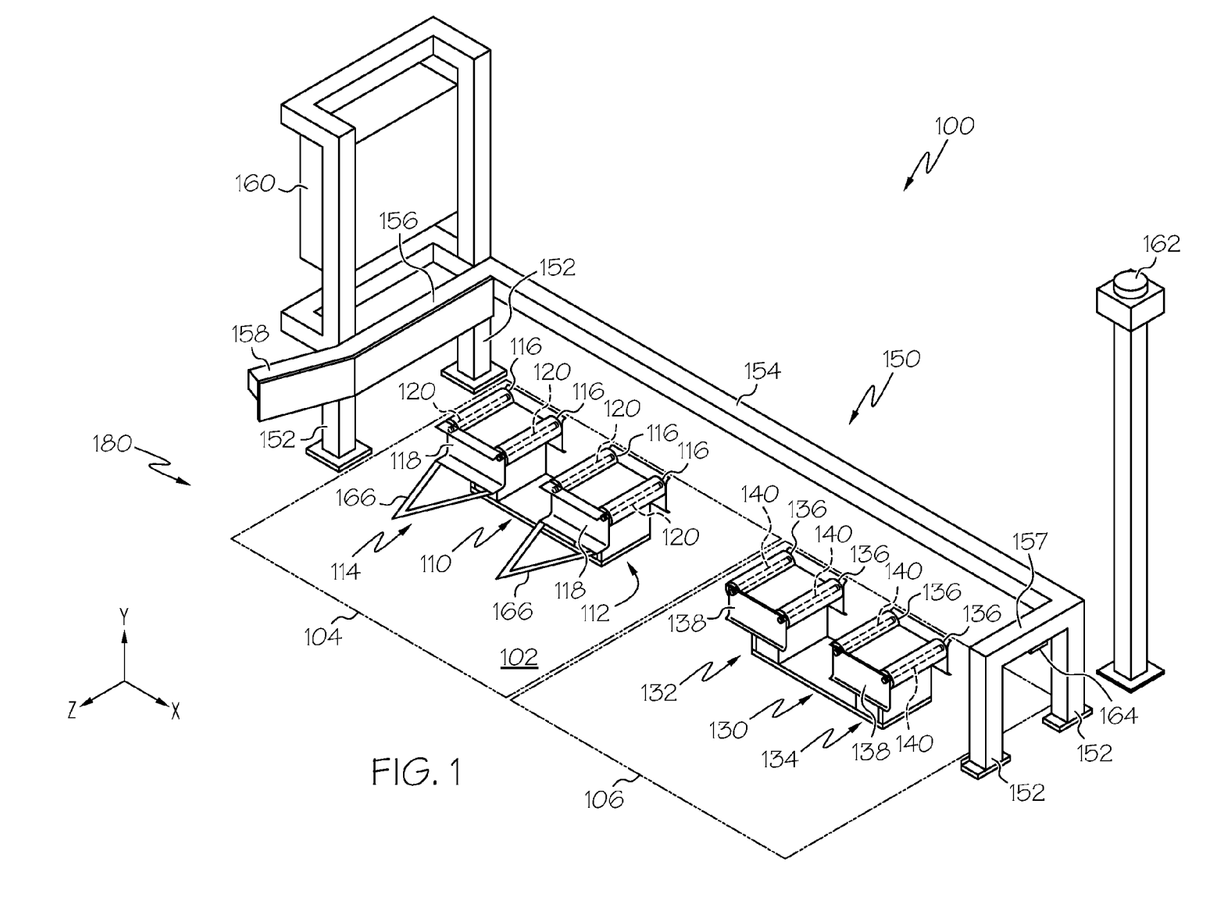
FIG. 1 schematically depicts a perspective view of a cart transferring apparatus according to one or more embodiments shown and described herein.

FIG. 1 generally depicts one embodiment of a cart transferring apparatus that can facilitate the use of carts with two fixed wheels and two swiveling casters by providing lateral movement of the cart. Specifically, the cart transferring apparatus generally includes a cart access, a transfer surface, and one or more lifts having rollers arranged along a lateral transfer direction. The one or more lifts can engage an underside of the cart with the rollers and lift the fixed wheels such that the fixed wheels are above the ground and the swivel casters are in contact with the ground. Accordingly, the cart can be urged along the transfer direction by rolling the underside along the rollers and the swivel casters along the transfer surface. Various embodiments of the cart transferring apparatus and systems that include the cart transferring apparatus will be described in more detail herein.

Figure 2:
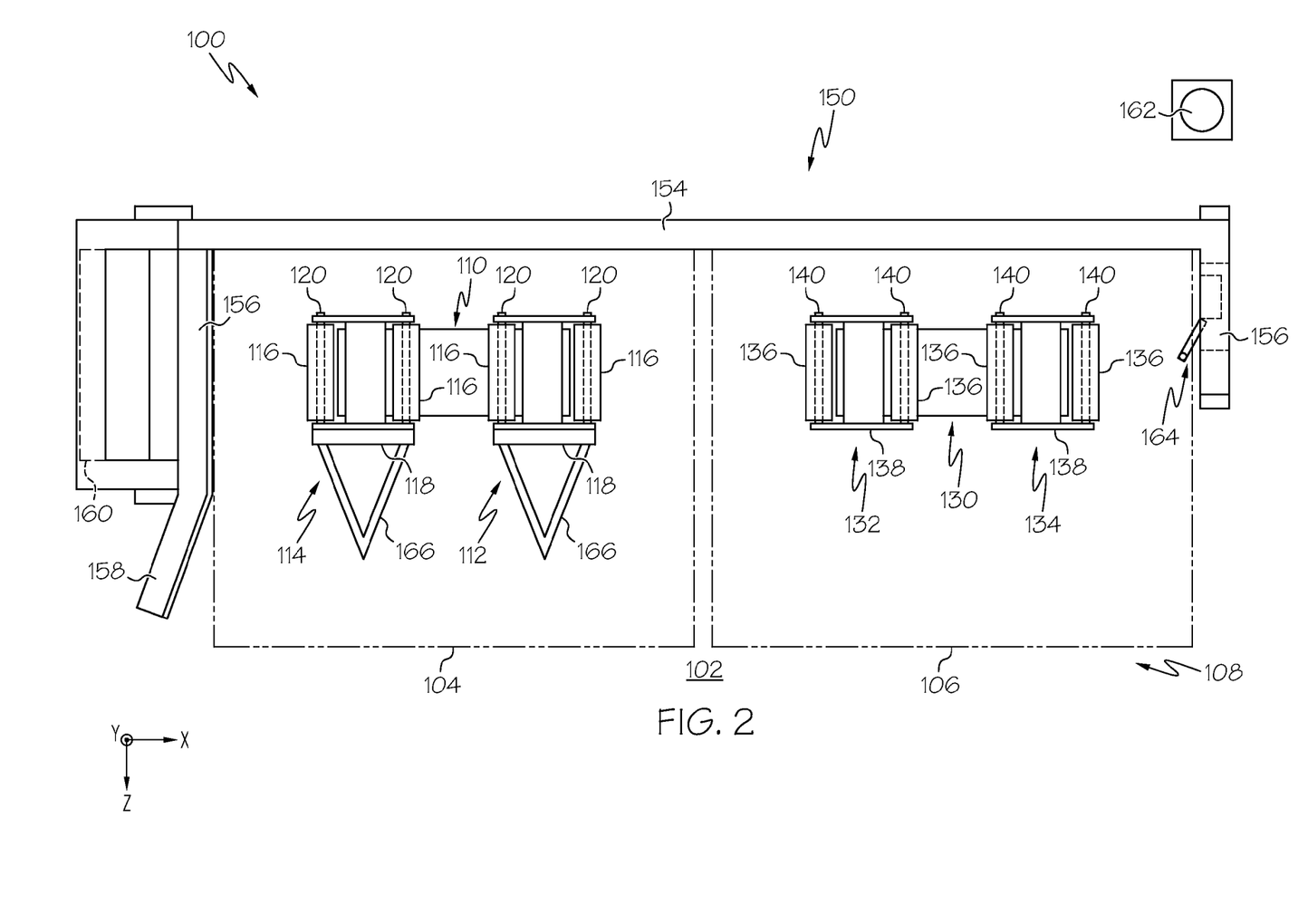
FIG. 2 schematically depicts a top view of the cart transferring apparatus of FIG. 1 according to one or more embodiments shown and described herein.

Referring collectively to FIGS. 1 and 2, a cart transferring apparatus 100 can comprise a transfer surface 102 spanning at least a portion of the cart transferring apparatus 100. The transfer surface 102 is generally configured to provide a fixed boundary in a substantially horizontal plane, i.e., a plane substantially aligned with a x-z plane. The transfer surface 102 can interact with rotating objects to facilitate rotation and travel along a direction of ingress and egress, i.e., a direction substantially aligned with the z-axis. The transfer surface 102 can further be configured to provide a fixed boundary that interacts with rotating objects to facilitate rotation and travel along a lateral direction, i.e., a direction substantially aligned with the x-axis. The transfer surface 102 can optionally be utilized as an underpinning for other structural and working members of the cart transferring apparatus 100. Accordingly, while the transfer surface 102 is depicted in FIG. 1 as a floor of a manufacturing facility, the transfer surface 102 can be any other rigid object that facilitates the motion described herein such as, for example, a plate member or the like.

The transfer surface 102 can comprise a loading station 104 and a working station 106 arranged laterally, i.e., a direction substantially aligned with the x-axis, with respect to the loading station 104. A cart access 108 can be provided adjacent to the loading station 104, the working station 106, or both. Each of the loading station 104 and the working station 106 is configured to receive a cart via the cart access 108. Accordingly, each of the loading station 104 and the working station 106 can demarcate a cart area that is greater than or equal to a footprint of a cart. That is, in embodiments with the loading station 104 and the working station 106 arranged adjacent to one another, each of the loading station 104 and the working station 106 can hold a cart or multiple carts. It is furthermore noted that, while FIGS. 1-8 depict the loading station 104 and the working station 106 as being arranged immediately adjacent to one another, the loading station 104 and the working station 106 can be spaced apart from one another. In some embodiments, one or more cart areas can be located there between. It is furthermore noted that the term "cart," as used herein, can mean a vehicle having a plurality of wheels that is configured for the conveyance of goods. Examples of carts are described in further detail below.

Referring still to FIGS. 1-2, the cart transferring apparatus 100 can comprise one or more lifts for urging carts vertically, i.e., a direction substantially aligned with the y-axis. In some embodiments, the cart transferring apparatus 100 can comprise a loading station lift 110 disposed within the loading station 104 of the transfer surface 102. The loading station lift 110 can be configured to raise and lower at least a portion of a cart vertically with respect to the loading station 104 of the transfer surface 102. In some embodiments, the loading station lift 110 can be fixedly engaged with the transfer surface 102 such that the loading station lift 110 is movable in only the y-direction. In some embodiments, the loading station lift 110 may be releasably engaged with the transfer surface 102 to allow for repositioning of the loading station lift 110 relative to the transfer surface 102 (e.g., along the x-axis, the y-axis, or both).

The loading station lift 110 can include one or more actuators configured to raise and lower a mass vertically. As used herein the term actuator generally means any type of servomechanism that supplies and transmits a controlled amount of energy substantially along a linear path. Accordingly, while FIGS. 1-8 depict actuators as pneumatic guide block cylinders, the actuators can be any type of device that can provide linear motion such as, for example, a mechanical actuator, a hydraulic actuator, a pneumatic actuator, an electrical actuator, or a combination thereof. In some embodiments, the actuators described herein can include a solenoid valve, i.e., an electromechanical solenoid that actuates a pneumatic or a hydraulic valve.

Figure 3:
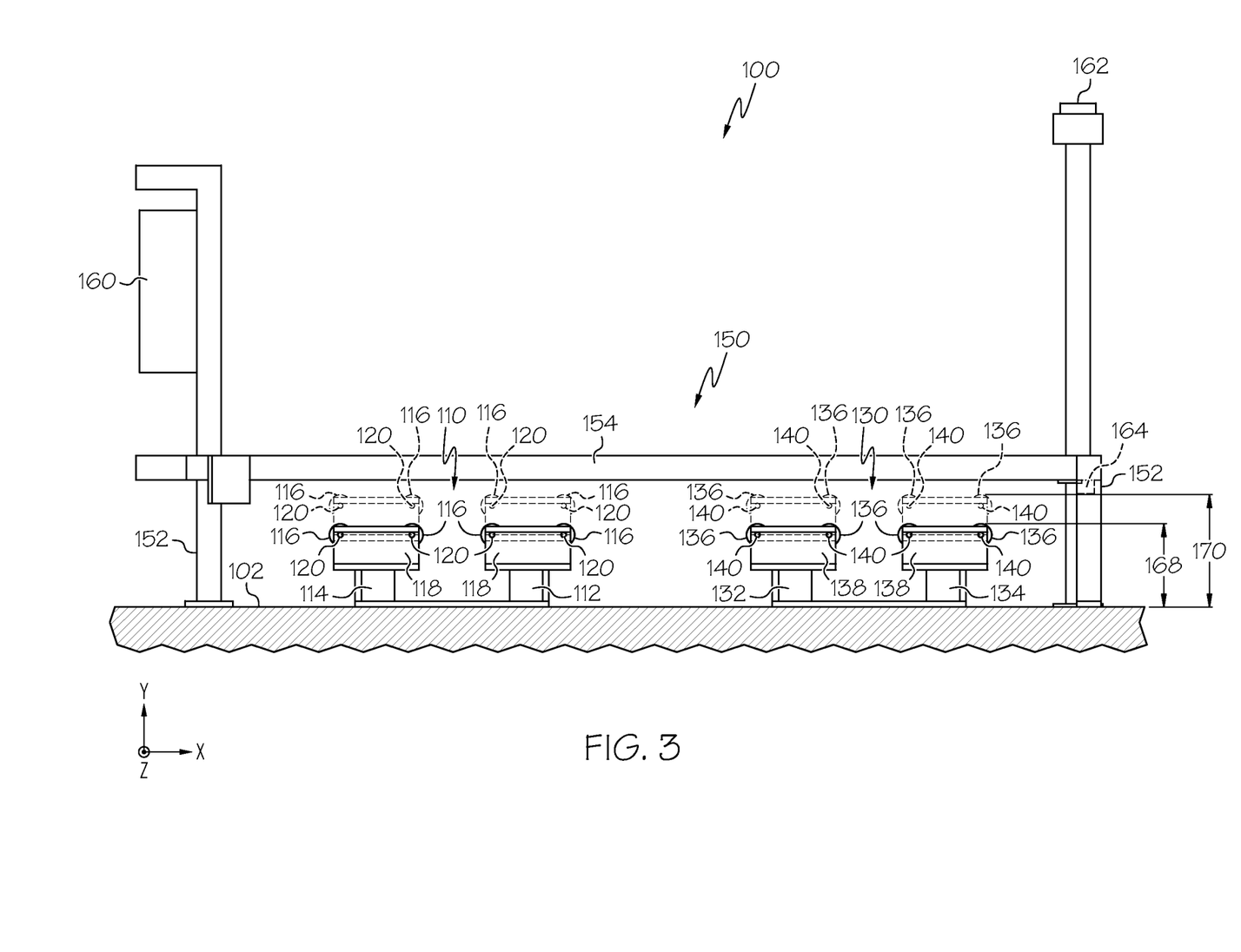
FIG. 3 schematically depicts a front view of the cart transferring apparatus of FIG. 1 according to one or more embodiments shown and described herein.

Referring collectively to FIGS. 1-3, the loading station lift 110 can comprise a first vertical actuator 112 and a second vertical actuator 114. Each of the first vertical actuator 112 and the second vertical actuator 114 can be configured to provide linear motion substantially vertically. Each of the first vertical actuator 112 and the second vertical actuator 114 can comprise one or more loading station rollers 116. The loading station rollers 116 can comprise any type of bearing configured to assist lateral motion of an object in contact with the loading station rollers 116. For example, the loading station rollers 116 can comprise gravity conveyor rollers. In one embodiment, each of the first vertical actuator 112 and the second vertical actuator 114 can comprise a roller housing 118 that is engaged with a roller axle 120 of each of the loading station rollers 116. Accordingly, each loading station roller 116 can be in rotatable engagement with the roller axle 120 such that the loading station roller 116 rotates around the roller axle 120. Additionally, it is noted that the roller axle 120, the loading station rollers 116, or both can be aligned with the direction of ingress and egress, i.e., the loading station rollers 116 can rotate around the z-axis.

Additionally, the cart transferring apparatus 100 can comprise a working station lift 130 disposed within the working station 106 of the transfer surface 102. The working station lift 130 can be configured to raise and lower at least a portion of a cart vertically with respect to the working station 106 of the transfer surface 102. In some embodiments, the working station lift 130 can be fixedly engaged with the transfer surface 102. It is noted that, while the embodiments of the loading station lift 110 and the working station lift 130 are depicted in FIGS. 1-8 as being substantially similar, the loading station lift 110 and the working station lift 130 can have different features provided that the loading station lift 110 and the working station lift 130 cooperate to perform the lifting and transferring operations described herein.

As is noted above with respect to the loading station lift 110, the working station lift 130 can include one or more actuators configured to raise and lower a mass vertically. The working station lift 130 can comprise a first vertical actuator 132 and a second vertical actuator 134. Each of the first vertical actuator 132 and the second vertical actuator 134 can be configured to provide linear motion substantially vertically. Each of the first vertical actuator 132 and the second vertical actuator 134 can comprise one or more working station rollers 136. The working station rollers 136 can comprise any type of bearing configured to assist lateral motion of an object in contact with the working station rollers 136. For example, the loading station rollers 116 can comprise gravity conveyor rollers. In one embodiment, each of the first vertical actuator 132 and the second vertical actuator 134 can comprise a roller housing 138 that is engaged with a roller axle 140 of each of the working station rollers 136. Accordingly, each working station roller 136 can be in rotatable engagement with the roller axle 140 such that the working station roller 136 rotates around the roller axle 140. Additionally, it is noted that the roller axle 140, the working station rollers 136, or both can be aligned with the direction of ingress and egress, i.e., the working station rollers 136 can rotate around the z-axis.

According to the embodiments described herein, the loading station lift 110 and the working station lift 130 can be aligned. Specifically, the loading station rollers 116 of the loading station lift 110 can be aligned laterally with the working station rollers 136 of the working station lift 130, i.e., a substantially straight member can be substantially aligned along the x-axis and in contact with one or more of the loading station rollers 116 and one or more of the working station rollers 136. Accordingly, the loading station rollers 116 and the working station rollers 136 cooperate to assist motion of an object substantially laterally. For example, when an object is in contact with one or more of the loading station rollers 116 contemporaneously with one or more of the working station rollers 136 and urged along a lateral path, one or more of the loading station rollers 116 and one or more of the working station rollers 136 can rotate in the same direction.

Referring still to FIGS. 1-3, the cart transferring apparatus 100 can comprise a guide structure 150 for demarcating an area for limiting movement of carts during operation of the cart transferring apparatus 100. The guide structure 150 can be formed of rigid and resilient members configured to resist fatigue or deflection during repeated operation. Accordingly, the guide structure 150 can be formed of sheets, tubing or both or metallic material, such as, but not limited to, steel or aluminum. The guide structure 150 can comprise a plurality of vertical members 152 that extend substantially vertically away from the transfer surface 102. In some embodiments, the vertical members 152 can be rigidly coupled to the transfer surface 102. It is noted that the vertical members 152 need not be coupled directly to the transfer surface 102, provided that the vertical members 152 are substantially fixed with respect to the transfer surface 102.

The guide structure 150 can comprise a lateral member 154 that extends substantially laterally and spans the loading station 104 and the working station 106 of the transfer surface 102. The guide structure 150 can further comprise a loading side member 156 and a working side member 157 that extend substantially along the direction of ingress and egress. In some embodiments, the lateral member 154, loading side member 156, and the working side member 157 can cooperate to delineate the loading station 104 and the working station 106. Specifically, the lateral member 154 can be configured to at least partially limit the extent of the loading station 104 and the working station 106 along the direction of ingress and egress. The loading side member 156 can be configured to at least partially limit the extent of the loading station 104 laterally beyond the loading station 104 in one direction. Similarly, the working side member 157 can be configured to at least partially limit the extent of the working station 106 laterally beyond the working station 106 in an opposite direction. Accordingly, the lateral member 154, loading side member 156, and the working side member 157 can cooperate to define the cart access 108 for loading carts into and unloading carts from the cart transferring apparatus 100. For example, the lateral member 154, loading side member 156, and the working side member 157 can form a partial enclosure having generally a one-sided opening. The cart access 108 can be provided at the opening of the lateral member 154, loading side member 156, and the working side member 157. The guide structure 150 can further comprise a lead-in member 158 extending at an angle to the loading side member 156 for enlarging the cart access 108 and providing a rigid guide for the ingress of carts.

In some embodiments, the lateral member 154, loading side member 156 and the working side member 157 can be fixedly engaged with one or more of the vertical members 152 to form the guide structure 150. Specifically, the lateral member 154 can span two or more of the vertical members 152 along the loading station 104 and the working station 106 of the transfer surface 102. The loading side member 156 can span two or more of the vertical members 152 along a side of the loading station 104 of the transfer surface 102. The working side member 157 can span two or more of the vertical members 152 along a side of the working station 106 of the transfer surface 102. In some embodiments, the lead-in member 158 can be fixedly engaged to the loading side member 156 adjacent to the loading station 104. As used herein, the phrase "fixedly engaged" can mean united as a single unit directly or indirectly via, for example, welds, fasteners, or being made integral.

Referring still to FIGS. 1-3, the cart transferring apparatus 100 can comprise a controller 160 that executes machine readable instructions to actuate the loading station lift 110 and the working station lift 130. The controller 160 can comprise a pneumatic circuit, a processor, an integrated circuit, a microchip, a computer, or any other device capable of executing machine readable instructions or pneumatic logic. In embodiments of the controller 160 that comprise a pneumatic circuit, the controller 160 can comprise compressors, air tanks, hoses, valves, cylinders, or combinations thereof. The controller 160 can further comprise memory such as RAM, ROM, a flash memory, a hard drive, or any device capable of storing machine readable instructions. The controller 160 can be communicatively coupled to the loading station lift 110 and the working station lift 130. As used herein, the phrase "communicatively coupled," as used herein, means that components are capable of exchanging data signals with one another such as, for example, electrical signals via conductive medium, electromagnetic signals via air, optical signals via optical waveguides, pressurized gas via transmission lines and the like.

In some embodiments, the controller 160 can be communicatively coupled to one or more input devices. As used herein, the phrase "input device" generally refers to a device that receives tactile input and transforms the tactile input into a data signal such as, for example, a switch, a button, and the like. For example, the controller 160 can be communicatively coupled to an upward input device 162 for receiving input indicative of a desire to actuate the loading station lift 110 and the working station lift 130 into a transferring state. In some embodiments, the upward input device 162 can be located adjacent to the working station 106. The controller 160 can also be communicatively coupled to a downward input device 164 for receiving input indicative of a desire to actuate the loading station lift 110 and the working station lift into a loading state. In some embodiments, the downward input device 164 can be fixedly engaged with the working side member 157. As is explained in greater detail below, the downward input device 164 can be configured to be actuated by a cart that is transferred from the loading station 104 to the working station 106.

Figure 4:
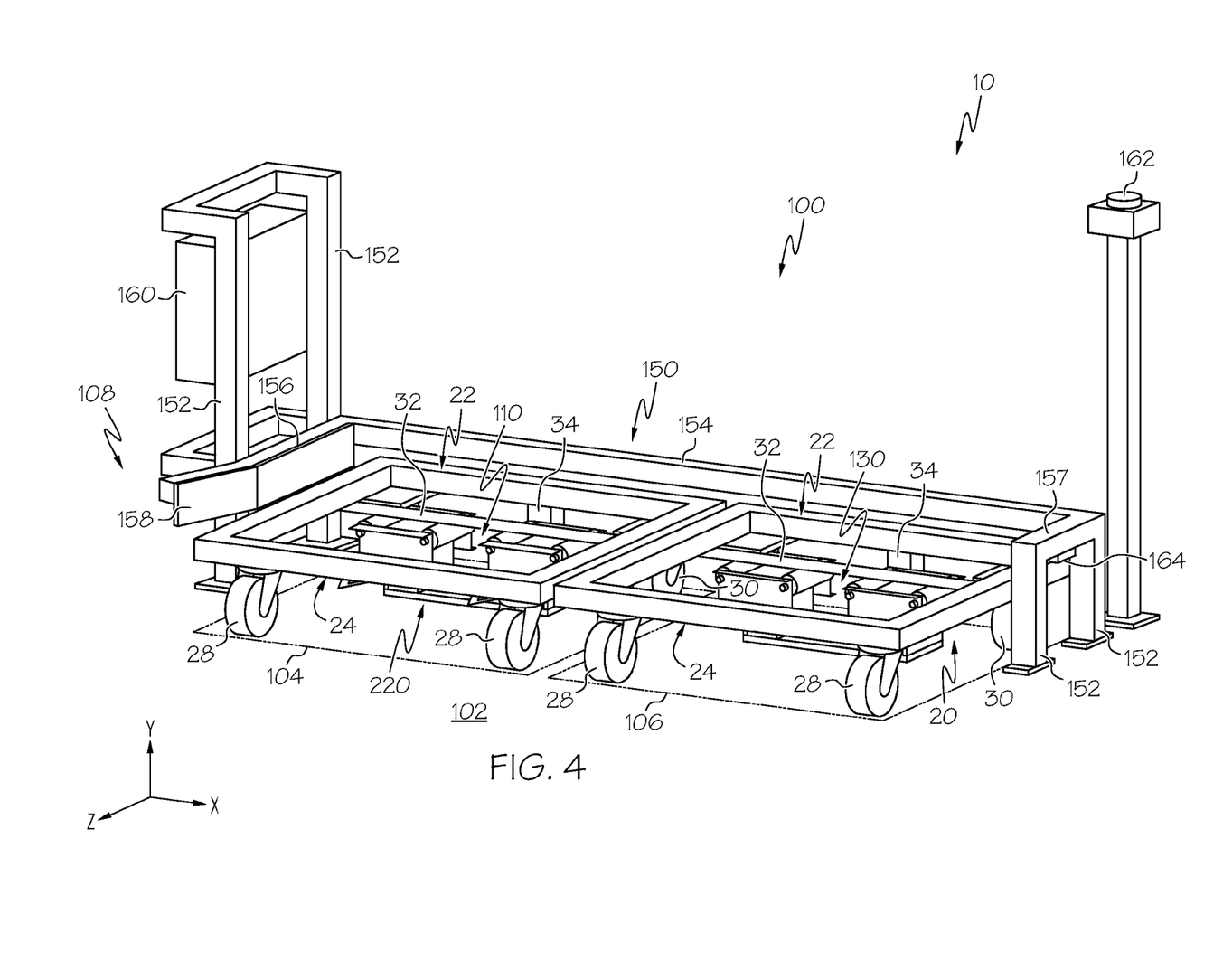
FIG. 4 schematically depicts a system for transferring cargo along a lateral path with the cart transferring apparatus of FIG. 1 according to one or more embodiments shown and described herein.
Figure 5:
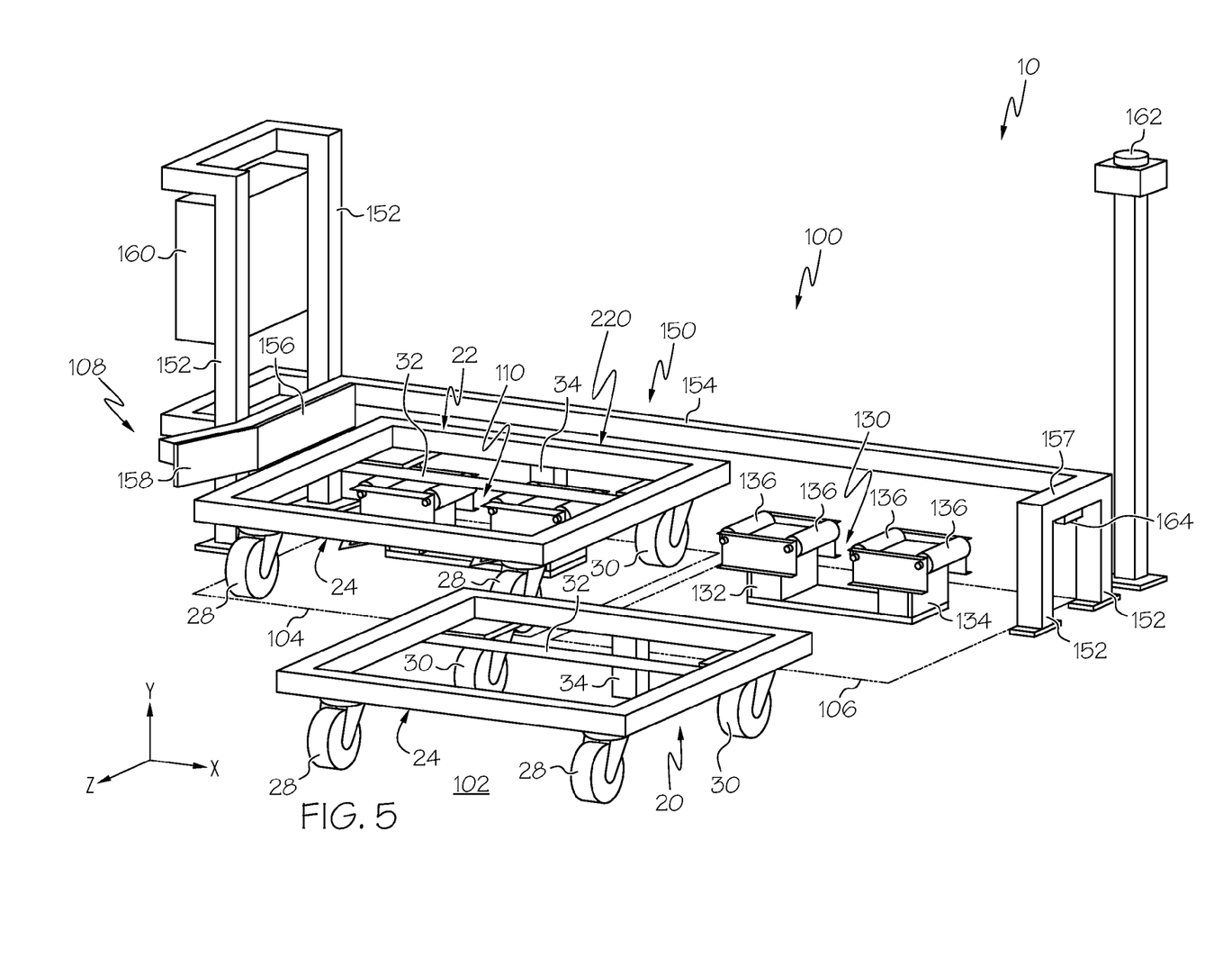
FIG. 5 schematically depicts a system for transferring cargo along a lateral path with the cart transferring apparatus of FIG. 1 according to one or more embodiments shown and described herein.
Figure 6:
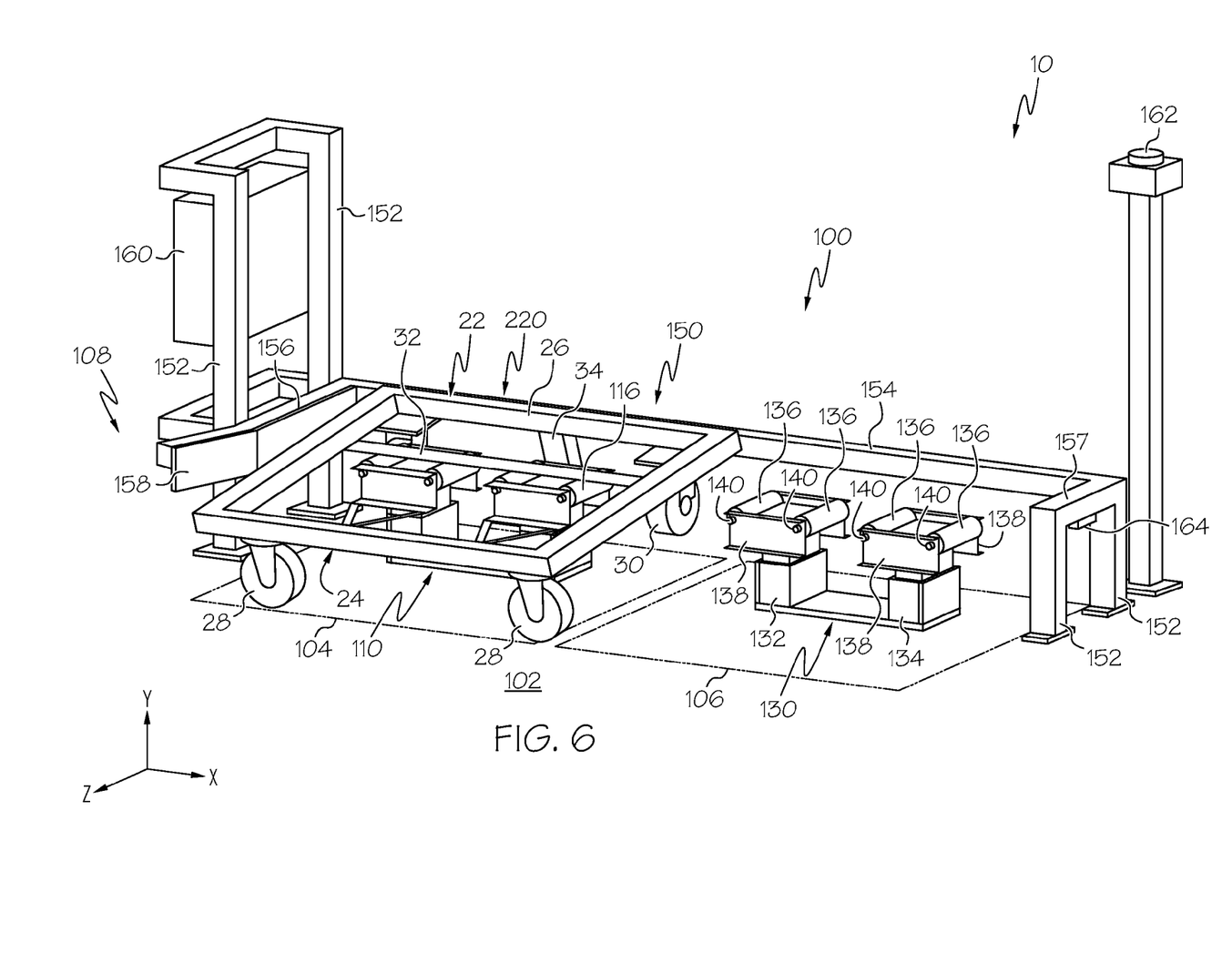
FIG. 6 schematically depicts a system for transferring cargo along a lateral path with the cart transferring apparatus of FIG. 1 according to one or more embodiments shown and described herein.
Figure 7:
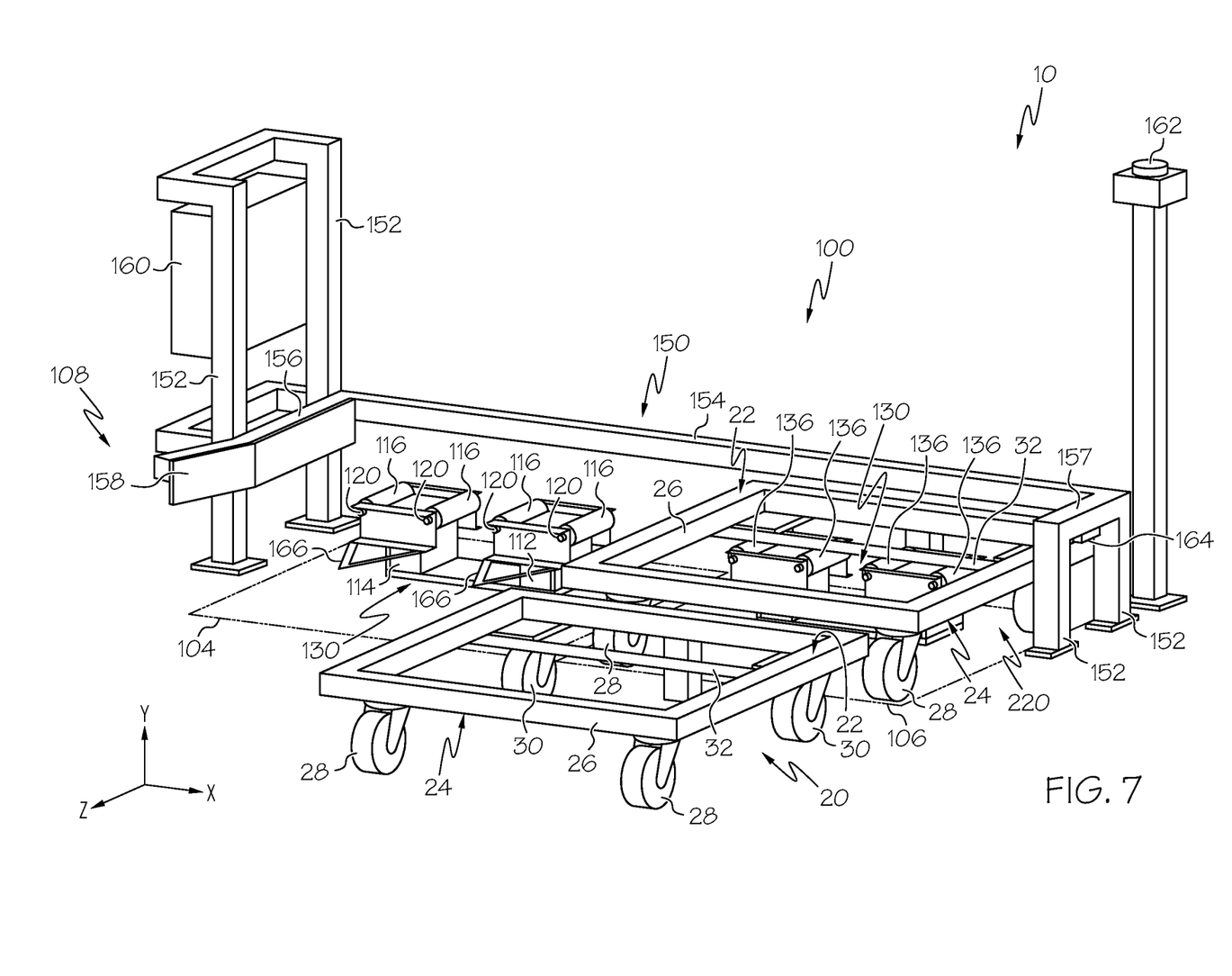
FIG. 7 schematically depicts a system for transferring cargo along a lateral path with the cart transferring apparatus of FIG. 1 according to one or more embodiments shown and described herein.
Figure 8:
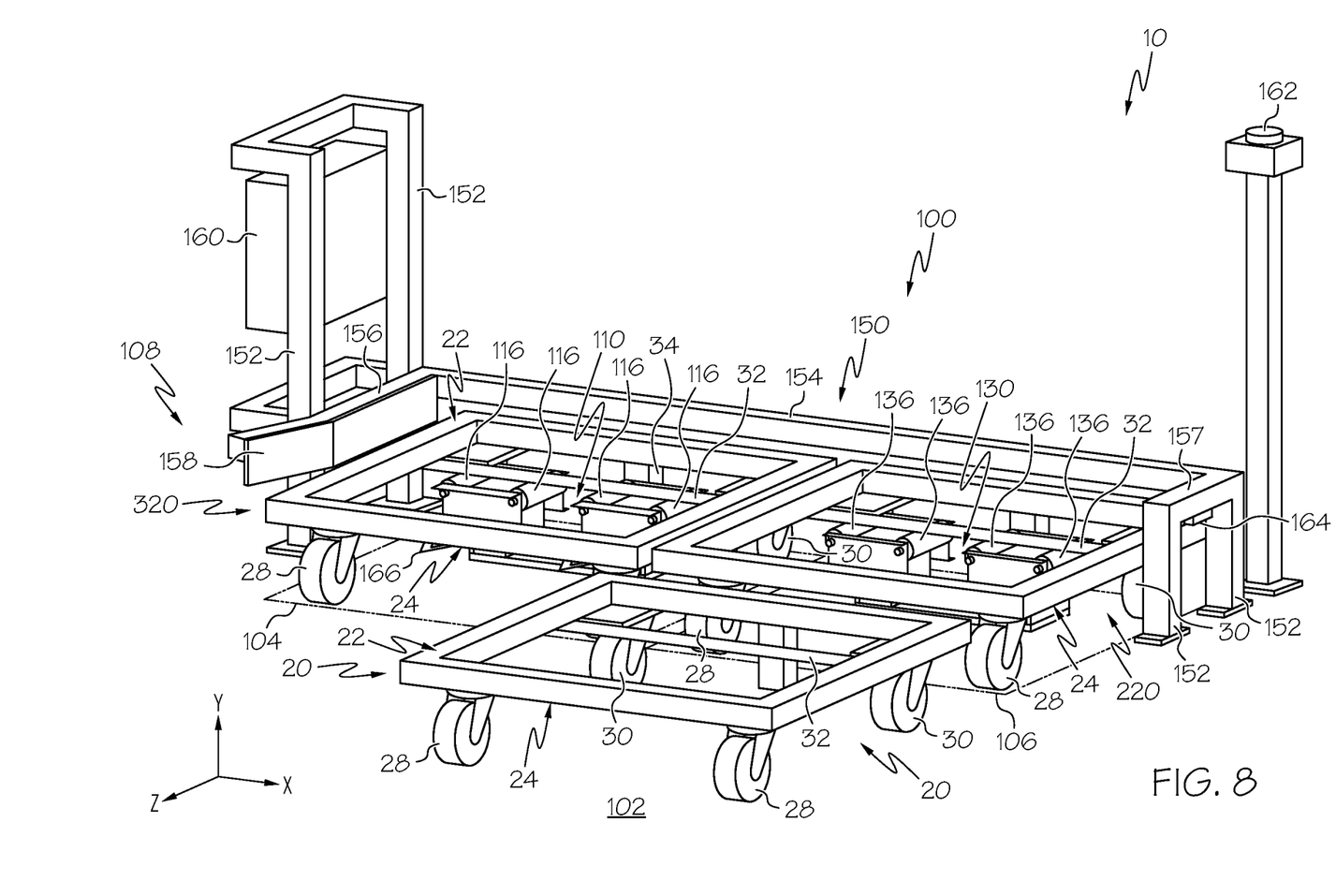
FIG. 8 schematically depicts a system for transferring cargo along a lateral path with the cart transferring apparatus of FIG. 1 according to one or more embodiments shown and described herein.

Referring collectively to FIGS. 4-8, a system 10 for transferring cargo along a lateral path can comprise the cart transferring apparatus 100 and one or more carts. It is noted that the embodiments depicted in FIGS. 4-8 depict a varying quantity of carts for clarity. Specifically, the embodiments of the system 10 depicted in FIGS. 4, 5, and 7 are described with reference to a cart 20 and a second cart 220. The embodiments depicted in FIG. 6 are described with reference to the cart 20. The embodiments depicted in FIG. 8 are described with reference to the cart 20, the second cart 220, and a third cart 320. Each of the cart 20, the second cart 220, and the third cart 320 can be substantially similar in structure. However, the embodiments described herein can be utilized with carts or varying construction. It is furthermore noted that the embodiments of the system 10 described herein can comprise any number of carts, i.e., one or more carts. However, it is believed, that the system 10 and the operation thereof can be described with high degree of clarity via reference to the cart 20, the second cart 220, and the third cart 320.

Referring collectively to FIGS. 4-8, each of the cart 20, the second cart 220, and the third cart 320 can comprise a cargo side 22 for supporting cargo and an underside 24 for interacting with the cart transferring apparatus 100. The cargo side 22 can be formed in any shape that is suitable to act as a vessel for supporting cargo. The cargo side 22 depicted in FIGS. 4-8 is configured to securely hold a vertical pallet (not depicted). Specifically, each of the cart 20, the second cart 220, and the third cart 320 can comprise a frame 26 configured to engage with the vertical pallet. However, it is noted that the embodiments described herein can include a cargo side 22 configured to hold any type of cargo. The underside 24 can be any downward facing body. For example, in the depicted embodiments, the underside 24 faces substantially along the y-axis (negative y-direction).

Each of the cart 20, the second cart 220, and the third cart 320 can be configured for rolling across surfaces. For example, the underside 24 can comprise one or more wheels. Each wheel can be any substantially circular or ball shaped member that rotates around an axis. In some embodiments, the underside 24 can be in rotatable engagement with one or more swivel casters 28. Accordingly, each swivel caster 28 can rotate around a substantially vertical axis with respect to the underside 24, i.e., an axis substantially aligned with the y-axis. The swivel caster 28 can further comprise a rolling member that is configured to rotate around a substantially horizontal axis. Since the swivel caster 28 can rotate around a substantially vertical axis, the substantially horizontal axis can be any vector that lies on a substantially horizontal plane, i.e., one of the x-z planes. The vertical axis and the horizontal axis of the swivel caster 28 can be offset. Accordingly, when the swivel caster 28 is urged along a direction and the rolling member is not aligned with the direction, the swivel caster 28 can rotate around the vertical axis such that the rolling member becomes aligned with the direction.

Alternatively or additionally, the underside 24 can be in engagement with one or more fixed wheels that are configured to rotate around a substantially fixed axis. In some embodiments, cart 20, the second cart 220, and the third cart 320 can comprise two swivel casters 28 in rotatable engagement with the underside 24 and two fixed casters 30 that are fixedly engaged with the underside 24. Accordingly, each of the cart 20, the second cart 220, and the third cart 320 can roll across surfaces along substantially straight paths, along substantially curved paths or combinations thereof.

Referring still to FIGS. 4-8, the underside 24 of each of the cart 20, the second cart 220, and the third cart 320 can comprise a roller engagement member 32 configured for supporting the respective cart upon the loading station rollers 116 and working station rollers 136 of the cart transferring apparatus 100. The roller engagement member 32 can be any member coupled to or integral with the underside 24 that is capable of supporting any cargo loaded upon the cargo side 22. Additionally, roller engagement member 32 is generally configured to assist a rolling interaction with the loading station rollers 116 and working station rollers 136 of the cart transferring apparatus 100. Accordingly, while the roller engagement member 32 is depicted in FIGS. 4-8 as being a substantially bar-shaped member, the roller engagement member 32 can be any object or portion of an object aligned with the underside 24 such as, for example, a plate, an object having a substantially flat surface, or a portion of an object that forms a substantially flat surface.

Referring collectively to FIGS. 3-8, the loading station lift 110 and the working station lift 130 of the cart transferring apparatus 100 can cooperate to perform lifting and transferring operations. The lifting and transferring operations are described herein with respect to discrete actions that occur during the lifting and transferring operations. It is noted that, while the actions are described herein as occurring in a specific sequence, the embodiments described herein are not limited to any specific sequence.

Referring collectively to FIGS. 3 and 4, the guide structure 150 of the cart transferring apparatus 100 can be located above the transfer surface 102 and bound a partial enclosure that limits the extent of the loading station 104 and the working station 106. The cart 20 can be positioned within the working station 106 such that the roller engagement member 32 of the cart 20 is aligned with the working station rollers 136. The working station lift 130 can be in a loading state (depicted in FIG. 3 as a solid line) such that the working station rollers 136 are spaced a relatively low distance 168 from the transfer surface 102. The cart 20 can be configured such that the underside 24 and the roller engagement member 32 of the cart 20 are clear of the working station rollers 136. Specifically, the underside 24 and the roller engagement member 32 of the cart 20 can be spaced from the transfer surface 102 a distance greater than the relatively low distance 168. Accordingly, the relatively low distance 168 can be lower than the height of the underside 24 such as, for example, less than about 18 inches in one embodiment, less than about 12 inches in another embodiment, or less than about than about 8 inches in a further embodiment.

The second cart 220 can be positioned within the loading station 104 such that the roller engagement member 32 of the second cart 220 is aligned with the loading station rollers 116. The loading station rollers 116 can be in the loading state (depicted in FIG. 3 as a solid line) such that the loading station rollers 116 are spaced the relatively low distance 168 from the transfer surface 102. The second cart 220 can be configured such that the underside 24 and the roller engagement member 32 of the cart 20 are clear of the loading station rollers 116. Accordingly, the cart 20 and the second cart 220 can be confined within the cart transferring apparatus 100 by the guide structure 150 such that the cart 20 and the second cart 220 can be moved freely through the cart access 108. Cargo (not depicted) loaded upon the cart 20 can be accessed by a user located adjacent to working side member 157 of the guide structure 150, while the cart 20 is located within the working station 106. Upon exhausting the cargo, which can be components used during an assembly process, the user may desire to remove the cart 20 from the cart transferring apparatus 100.

Referring collectively to FIGS. 4 and 5, while the loading station lift 110 and the working station lift 130 are in the loading state, the cart 20 can be removed from the cart transferring apparatus 100. Specifically, the cart 20 can be urged along the direction of ingress and egress through the cart access 108 and moved outside of the working station 106 of the transfer surface 102. Accordingly, the working station 106 can be made available for the second cart 220.

Referring collectively to FIGS. 3 and 6, the cart transferring apparatus 100 can be actuated to facilitate the lateral transfer of the second cart 220. For example, the upward input device 162 can receive tactile input such as, for example, from a user located adjacent to the working side member 157 of the guide structure 150. Upon receiving the tactile input, the upward input device 162 can communicate a data signal to the controller 160. The controller 160 can receive the data signal and actuate the loading station lift 110 and the working station lift 130 to a transferring state (depicted in FIG. 3 as dashed line). In some embodiments, the loading station lift 110 and the working station lift 130 can be actuated contemporaneously. However, the loading station lift 110 and the working station lift 130 need not be actuated at the same time, provided that the loading station lift 110 and the working station lift 130 are at the transferring state when the second cart 220 is urged laterally.

The loading station lift 110 can be in the transferring state such that the loading station rollers 116 are spaced a relatively high distance 170 from the transfer surface 102. The second cart 220 can be configured such that the roller engagement member 32 of the second cart 220 is raised by the loading station rollers 116. Prior to being raised by the loading station rollers 116, the roller engagement member 32 of the second cart 220 can be spaced from the transfer surface 102 a distance greater than the relatively low distance 168 and less than the relatively high distance 170. In some embodiments, the relatively high distance 170 can be larger than the relatively low distance 168 by a lift distance such as, for example, the lift distance can be less than about 10 inches in one embodiment, the lift distance can be less than about 6 inches in another embodiment, or the lift distance can be less than about than about 4 inches in a further embodiment. Accordingly, as the loading station lift 110 transitions to the transferring state, the loading station rollers 116 come into contact with the roller engagement member 32 of the second cart 220 and begin to raise the second cart 220.

The roller engagement member 32 can be offset towards one side of the second cart 220. Accordingly, when the loading station rollers 116 are in the transferring state, the second cart 220 can be raised at an angle. Specifically, the second cart 220 can be raised such that at least a portion of the load supported by the fixed casters 30 is carried by the roller engagement member 32 and the loading station lift 110. When raised and angled, the swivel casters 28 of the second cart 220 can be in contact with the transfer surface 102 and the fixed casters 30 of the second cart 220 can be raised out of contact with the transfer surface 102.

To facilitate lateral motion of the second cart 220, the working station lift 130 can be in the transferring state (depicted in FIG. 3 as a dashed line) such that the working station rollers 136 are spaced the relatively high distance 170 from the transfer surface 102. It may be desirable to have the working station rollers 136 and the loading station rollers 116 in alignment at a single height. However, perfect alignment is not necessary, and in some circumstances, due to manufacturing tolerances and cost, may not be economically feasible. Indeed, it is contemplated that during operation of the cart transferring apparatus 100, the alignment between various components of the loading station lift 110 and the working station lift 130 may be altered without affecting operation. Such variations in alignment can be accommodated by sizing the roller engagement member 32, the working station rollers 136 and the loading station rollers 116 appropriately.

Referring still to FIGS. 3 and 6, while the second cart 220 is supported by the loading station lift 110, the roller engagement member 32 of the second cart 220 can be aligned with the working station rollers 136. Accordingly, as the second cart 220 is urged laterally towards the working station lift 130, the roller engagement member 32 of the second cart 220 can travel along the loading station rollers 116. Contemporaneously, the swivel casters 28 of the second cart 220 can roll along the transfer surface 102. Since the lateral motion of the of the second cart 220 is facilitated by the rolling motion of the swivel casters 28 and the loading station rollers, the second cart can be moved laterally to the working station 106 without the use of the fixed casters 30. Indeed, the lateral motion can be made possible because the fixed casters 30 are not in contact with the transfer surface 102 and the load normally carried by the fixed casters 30 is supported instead by the loading station rollers 116 and the swivel casters 28. The second cart 220 can be urged manually, or the cart transferring apparatus can comprise a lateral motive member for urging the second cart 220, rotating rollers, or both.

As the second cart 220 moves laterally, the roller engagement member 32 approaches the working station rollers 136. The loading station lift 110 and the working station lift 130 can be spaced a predetermined distance apart, i.e., the span between the loading station roller 116 closest to the working station 106 and the working station roller 136 closest to the loading station 104 can be spaced laterally by the predetermined distance. In some embodiments, the predetermined distance can be set such that it is less than or equal to one half of the length, i.e., lateral extent, of the roller engagement member 32. Accordingly, the second cart 220 can be urged laterally into working station 106 such that the roller engagement member 32 is simultaneously in contact with one or more loading station roller 116 and one or more working station roller 136. In some embodiments, one of the swivel casters 28 can be in the loading station 104 and one of the swivel casters 28 can be in the working station 106, while the roller engagement member 32 is simultaneously in contact with one or more loading station roller 116 and one or more working station roller 136.

In further embodiments, the second cart 220 can contact the guide structure 150 as the second cart 220 is transferred laterally from the loading station 104 to the working station 106. Accordingly, the guide structure 150 can constrain the motion of the second cart 220 to facilitate the lateral transfer. Specifically, the frame 26, or another portion, of the second cart 220 can slide along the lateral member 154 of the guide structure 150.

Referring collectively to FIGS. 3, 6 and 7, while the working station lift 130 is in the transferring state, the second cart 220 can be urged into the working station 106. In some embodiments, the relatively high distance 170 can be set such that the second cart 220 is substantially aligned with the downward input device 164. Specifically, the height of the working station rollers 136 can be set such that, while the working station lift 130 is in the transferring state and the roller engagement member 32 is in contact with the working station rollers 136, the frame 26 of the second cart 220 can be aligned with the downward input device 164. Accordingly, the second cart 220 can actuate the downward input device 164 upon reaching the working side member 157. The downward input device 164 can transform the tactile input into a data signal and communicate the data signal to the controller 160. The controller 160 can actuate the loading station lift 110 and the working station lift 130 to the loading state (FIG. 7).

Referring collectively to FIGS. 7 and 8, while the second cart 220 is in the working station 106 and the loading station lift 110 and working station lift are in the loading state, a third cart 320 can be urged into the loading station 104. In some embodiments, the lead-in member 158 of the guide structure 150 can extend the cart access 108 to provide additional area for the third cart 320. Specifically, the lead-in member 158 can be fixedly engaged with the loading side member 156 and oriented a substantially obtuse angle with respect to the lateral member 154 of the guide structure. In some embodiments, the lead-in member 158 can extend downward from the loading side member 156. Accordingly, the third cart 320 can slide along the lead-in member 158. The lead-in member 158 can constrain motion of the third cart 320 to guide the third cart 320 into the loading station 104.

Alternatively or additionally, the third cart 320 can comprise an alignment member 34 extending downward from the underside 24 of the third cart 320. Each of the first vertical actuator 112 and the second vertical actuator 114 can comprise a substantially triangular member 166 such that the base of the substantially triangular member 166 is fixedly engaged with the actuator. Accordingly, the substantially triangular members 166 can cooperate with the alignment member 34 to guide the third cart 320 into the loading station 104.

It should now be understood that the embodiments described herein can be utilized to transfer carts at about a 90° angle with respect to a loading direction. Accordingly, carts with two fixed wheels and two swiveling casters can be provided with lateral movement. Such lateral motion can enable the use of carts with two fixed wheels and two swiveling casters in a laterally staged arrangement. Specifically, carts can be moved into a staging position and then shifted laterally for use. Accordingly, cargo can be loaded, unloaded, or both from the carts at a rate that is different from the rate of time for delivering the cargo for staging. For example, if the carts hold components used for assembly, the assembly process can consume parts at a faster rate than the delivery of carts. By staging the carts, the components can be delivered at a slower rate than consumption, and the assembly process need not wait for new work pieces or slow the consumption rate. Thus, the embodiments described herein can facilitate improved manufacturing yields.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Furthermore, it is noted that directional references such as, for example, direction of ingress and egress, x-axis, y-axis, z-axis and the like have been provided for clarity and without limitation. Specifically, it is noted such directional references are made with respect to the coordinate system depicted in FIGS. 1-8. Thus, the directions may be reversed or oriented in any direction by making corresponding changes to the provided coordinate system with respect to the structure to extend the examples described herein.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An apparatus for transferring carts comprising:
a transfer surface comprising a loading station and a working station arranged laterally with respect to the loading station;
a loading station lift disposed within the loading station of the transfer surface, wherein the loading station lift comprises loading station rollers that are in rotatable engagement with the loading station lift;
a working station lift disposed within the working station of the transfer surface and aligned with the loading station lift, wherein the working station lift comprises working station rollers that are in rotatable engagement with the working station lift;
a controller that actuates the loading station lift and the working station lift between a loading state and a transferring state, wherein:
when the loading station lift and the working station lift are in the loading state, the loading station rollers and the working station rollers are offset a relatively low distance above the transfer surface; and
when the loading station lift and the working station lift are in the transferring state, the loading station rollers and the working station rollers are offset a relatively high distance above the transfer surface, wherein the loading station rollers and the working station rollers are aligned along a lateral direction;
a downward input device communicatively coupled to the controller and fixedly engaged with a working side member, wherein the downward input device transmits a data signal to the controller and the controller actuates the loading station lift and the working station lift to the loading state upon receiving the data signal, the downward input device located on the working side member for actuation by a cart moving along the working station rollers with the working lift station in the transferring state; and
a guide structure that bounds the loading station and the working station and defines a cart access adjacent to the loading station and the working station, wherein the guide structure comprises a lateral member that extends substantially laterally between a loading side member and the working side member, where the loading side member and the working side member at least partially limit the loading station and the working station, respectively, along a direction of ingress and egress.

2. The apparatus of claim 1, wherein each of the loading station lift and the working station lift comprises a vertical actuator configured to provide linear motion substantially vertically.

3. The apparatus of claim 2, wherein the vertical actuator comprises a pneumatic guide block cylinder.

4. The apparatus of claim 1, wherein the transfer surface is formed at least in part from a floor of a manufacturing facility.

5. The apparatus of claim 1, wherein the loading station rollers comprise one or more gravity conveyor rollers.

6. The apparatus of claim 1, wherein the loading station rollers and the working station rollers rotate around an axis substantially aligned with the direction of ingress and egress.

7. The apparatus of claim 1, wherein the guide structure comprises a lead in member adjacent to the cart access, and wherein the lead in member is oriented at a substantially obtuse angle with respect to the lateral member.

8. The apparatus of claim 1, wherein the guide structure comprises the working side member that delineates the working station laterally.

9. The apparatus of claim 1, wherein the working station rollers are substantially aligned with the downward input device when the working station lift is in the transferring state.

10. The apparatus of claim 1, further comprising an upward input device located adjacent to the working station communicatively coupled to the controller, wherein the upward input device transmits a data signal to the controller and the controller actuates the loading station lift and the working station lift to the transferring state upon receiving the data signal.

11. An apparatus for transferring carts comprising:
a transfer surface comprising a loading station and a working station arranged laterally with respect to the loading station;
a loading station lift fixedly engaged with the transfer surface within the loading station, wherein the loading station lift comprises loading station rollers that are in rotatable engagement with the loading station lift;
a working station lift fixedly engaged with the transfer surface within the loading station and aligned with the loading station lift, wherein the working station lift comprises working station rollers that are in rotatable engagement with the working station lift;
a downward input device offset at least a relatively high distance from the transfer surface, wherein when the downward input device is actuated, the loading station lift and the working station lift transition to a loading state such that the loading station rollers and the working station rollers are offset a relatively low distance above the transfer surface; and
an upward input device located adjacent to the working station, wherein when the upward input device is actuated, the loading station lift and the working station lift are transitioned to a transferring state such that the loading station rollers and the working station rollers are offset the relatively high distance above the transfer surface;
wherein the downward input device is located for actuation by a cart moving along the working station rollers with the working lift station in the transferring state; and
a guide structure that bounds the loading station and the working station and defines a cart access adjacent to the loading station and the working station, wherein the guide structure comprises a lateral member that extends substantially laterally between a loading side member and the working side member, where the loading side member and the working side member at least partially limit the loading station and the working station, respectively, along a direction of ingress and egress.

12. The apparatus of claim 11, wherein each of the loading station lift and the working station lift comprises a first vertical actuator and a second vertical actuator that are configured to provide linear motion substantially vertically.

13. A system for transferring cargo along a lateral path:
a cart comprising one or more swivel casters, one or more casters, and a roller engagement member located on an underside of the cart;
a transfer surface comprising a loading station and a working station arranged laterally with respect to the loading station, wherein each of the loading station and the working station of the transfer surface demarcates a cart area that is greater than or equal to a footprint of the cart;
a loading station lift disposed within the loading station of the transfer surface, wherein the loading station lift comprises loading station rollers that are in rotatable engagement with the loading station lift;
a working station lift disposed within the working station of the transfer surface and aligned with the loading station lift, wherein the working station lift comprises working station rollers that are in rotatable engagement with the working station lift;
a controller that actuates the loading station lift and the working station lift between a loading state and a transferring state, wherein:
when the loading station lift and the working station lift are in the loading state and the cart is in the loading station, the roller engagement member is located above and out of contact with the loading station rollers while the one or more casters and the one or more swivel casters contact the transfer surface; and
when the loading station lift and the working station lift are in the transferring state and the cart is in the loading station, the roller engagement member of the cart contacts the loading station rollers that have elevated the roller engagement member of the cart, the one or more casters are raised out of contact with the transfer surface, and the one or more swivel casters of the cart contact the transfer surface, wherein the roller engagement member of the cart cooperates with the loading station rollers and the working station rollers as the cart is urged along the lateral path at an angle with respect to the transfer surface; and
a downward input device communicatively coupled to the controller, wherein the downward input device transmits a data signal to the controller and the controller actuates the loading station lift and the working station lift to the loading state upon receiving the data signal, and wherein when the working station lift is in the transferring state and the cart is in contact with the working station rollers, the cart actuates the downward input device.

14. The system of claim 13, wherein the roller engagement member comprises a substantially bar-shaped member.

15. The system of claim 13, wherein the roller engagement member is offset towards one side of the cart.

16. The system of claim 13, wherein the roller engagement member has a lateral length, and the loading station lift and the working station lift are offset a distance that is less than or equal to one half of the lateral length.

17. The apparatus of claim 1, wherein a frame of the cart is aligned with the working side member in the transferring state to reach and provide tactile input to the downward input device that is fixedly engaged to the working side member, such that when the loading station lift and the working station lift are lowered to the loading state upon receiving the data signal, the frame of the cart in the loading state is disposed below and not aligned with the working side member.

18. The apparatus of claim 11, wherein a frame of the cart is aligned with the downward input member in the transferring state to reach and provide tactile input to the downward input device to actuate the downward input device, and such that when the loading station lift and the working station lift transition to the loading state, the frame of the cart in the loading state is disposed below and not aligned with the downward input device.

* * * * *